L. L. NAIL.
MACHINE FOR DESTROYING INSECTS.
APPLICATION FILED AUG. 4, 1914.

1,122,410.

Patented Dec. 29, 1914.
3 SHEETS—SHEET 1.

L. L. NAIL.
MACHINE FOR DESTROYING INSECTS.
APPLICATION FILED AUG. 4, 1914.

1,122,410.

Patented Dec. 29, 1914.

3 SHEETS—SHEET 2.

L. L. Nail,

By Mansell & Mills

Attorney

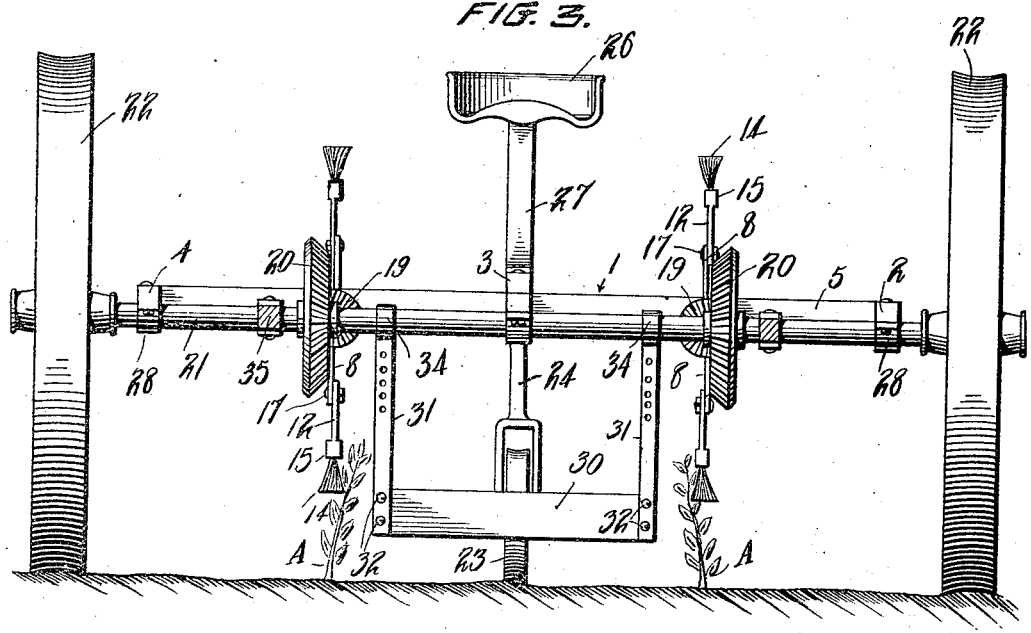
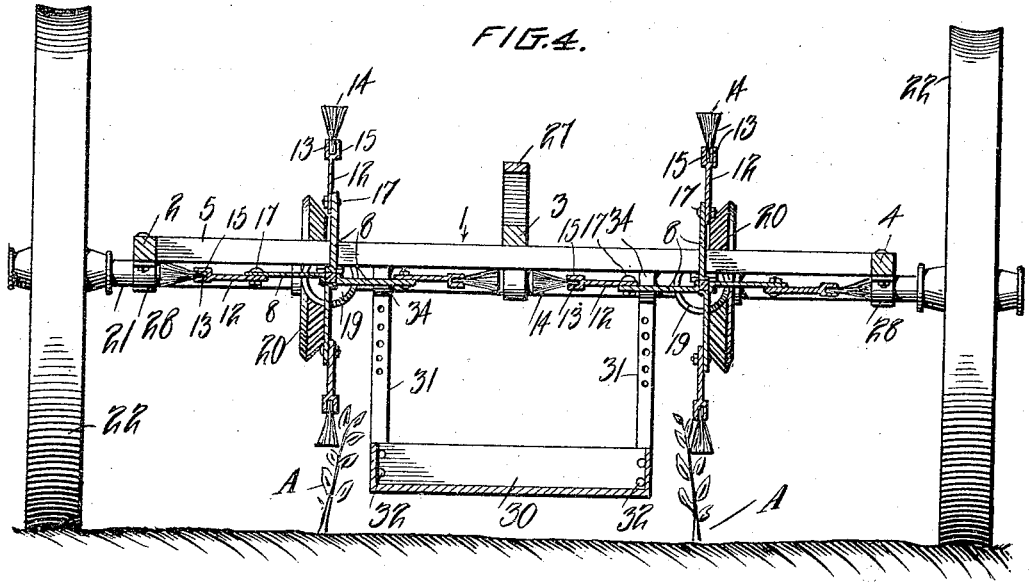

UNITED STATES PATENT OFFICE.

LOUIS L. NAIL, OF JOURDANTON, TEXAS.

MACHINE FOR DESTROYING INSECTS.

1,122,410.  Specification of Letters Patent.  Patented Dec. 29, 1914.

Application filed August 4, 1914. Serial No. 855,057.

*To all whom it may concern:*

Be it known that I, LOUIS L. NAIL, a citizen of the United States, residing at Jourdanton, in the county of Atascosa and State of Texas, have invented new and useful Improvements in Machines for Destroying Insects, of which the following is a specification.

My invention relates to new and useful improvements in insect destroyers and more particularly to that class especially adapted to the extermination of boll-weevils, which infest young cotton plants and cause serious injury thereto.

While my invention possesses various advantages over machines heretofore adapted to this line of work, namely; the extermination of insects, a few particular objects will be noted which are: to provide a machine, simple in construction and operation; to provide a machine of such construction that proper adjustments may be made in the operating parts so that said machine may be accommodated to plants of various heights; to provide a machine in which the insect removing parts are constructed of substantial, soft, pliable and adjustable brushes which sever the said insects from a delicate plant without injuring same; to provide insecticide carrying means associated with the insect removing brushes for receiving the insects and destroying the same. With these and other objects in view which will become apparent upon reference to the accompanying drawing and specification, I will proceed to describe my invention in which—

Figure 1:
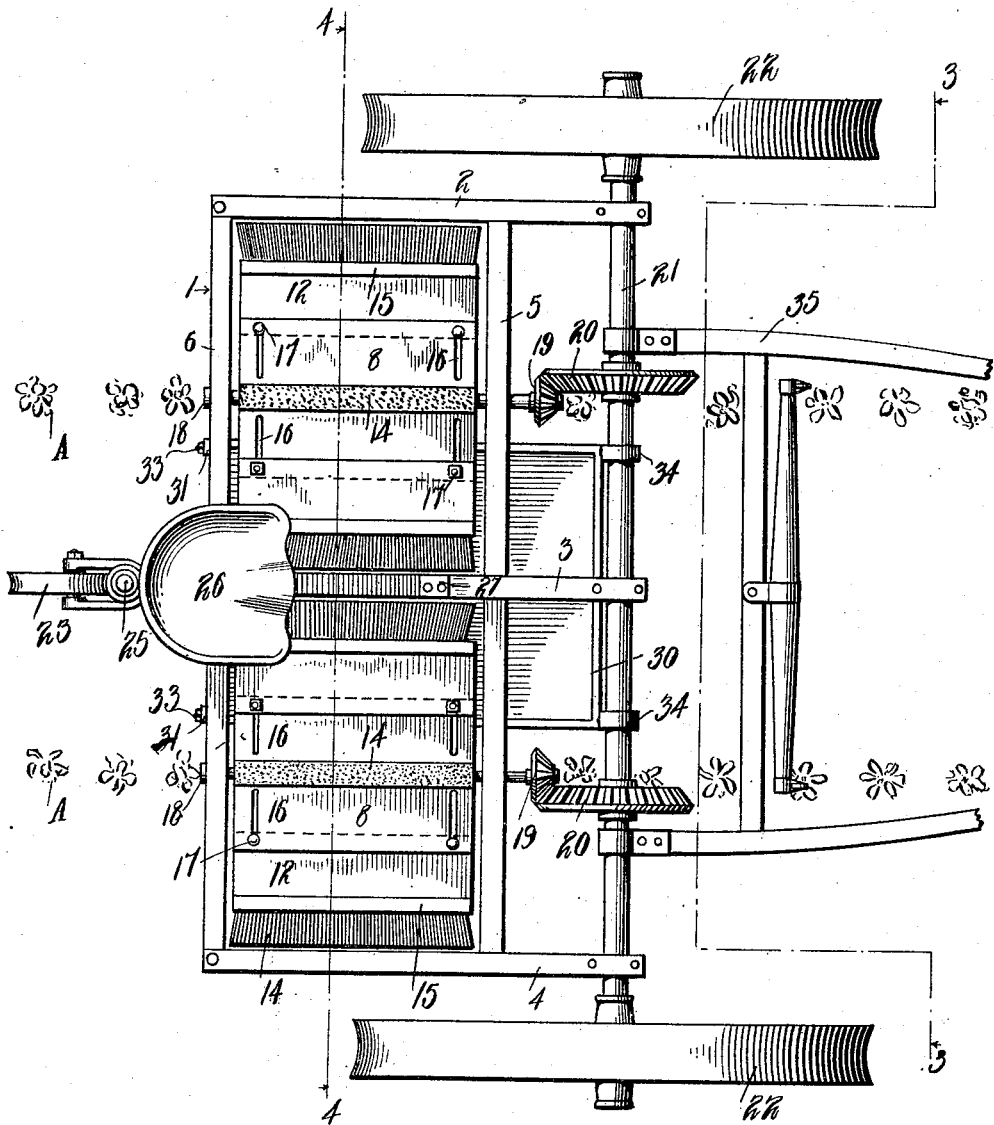
Figure 2:
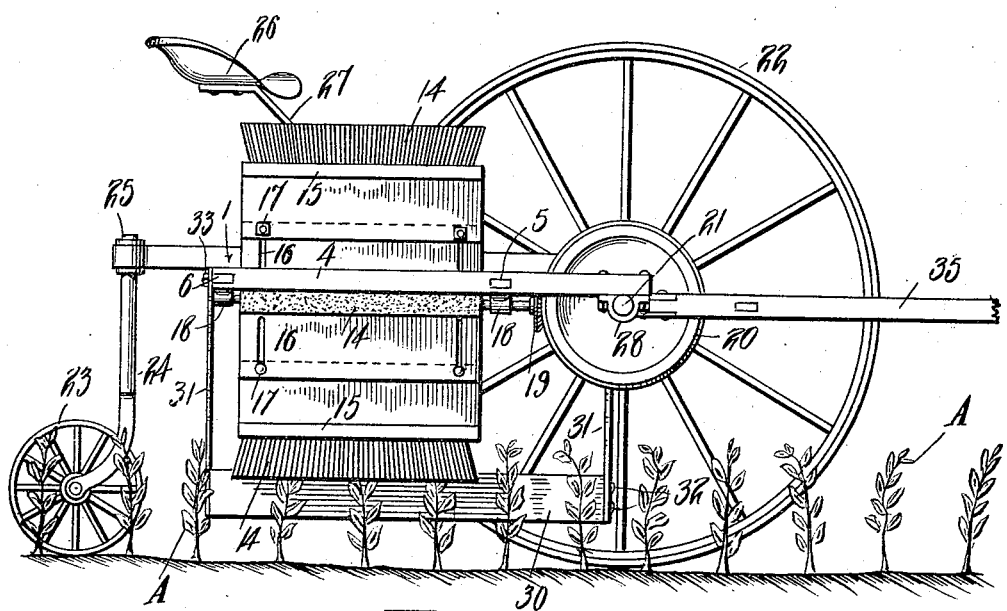
Figure 3:
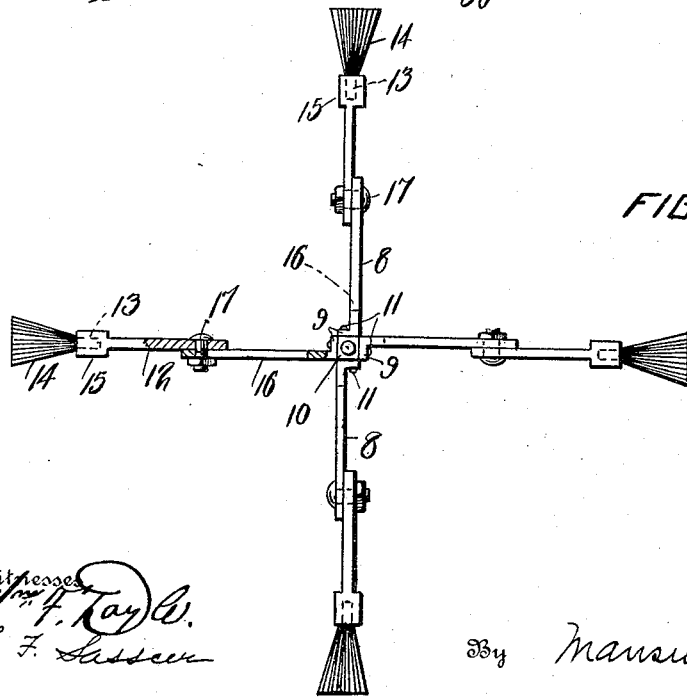

Figure 1 is a top plan view of my machine; Fig. 2 is a side elevation thereof with one of the wheels removed for sake of clearness of illustration; Fig. 3 is a front elevation of the machine on line 3—3 of Fig. 1; Fig. 4 is a transverse section on the line 4—4 of Fig. 1, viewing the machine from the rear, and, Fig. 5 is an end view partly in elevation and partly in section of one of the insect removing brushes, and illustrating in detail a preferred embodiment of the brush adjustment.

Referring now more particularly to the various figures in the drawings by numerals of reference, 1 illustrates the main supporting frame preferably rectangular in form and constituted by the longitudinal bars 2, 3 and 4 and the transverse bars 5 and 6, this superstructure providing a supporting means whereby suitable brush mechanism now to be described is mounted for operation. These brushes more particularly disclosed in Fig. 5 consist of a plurality of independent flat plates 8, constituting the main brush supports and each having an inner marginal flange 9, through the medium of which the various brushes are mounted upon the angular shaft 10 by detachable fastening devices permitting the brushes to be independently removed for repair or replacement should any one or more become worn out or damaged at any time.

Associated with each of the plates 8 and mounted thereon is another flat plate 12 somewhat similar to its associated plate 8, said plates 12 each having at its extreme outer longitudinal edge an enlargement 15 in which is formed a substantially deep longitudinal groove 13, said groove serving as a seat for the brush 14 and in which groove the said brush is securely fixed by any suitable means. The fact that the plates 12 are provided with the longitudinal enlargement 14, not only permits of a better construction in which to provide the brush groove but also forms a reinforcement where the strain on the brush supports is possibly the greatest. To permit of the adjustment of the brushes independent of each other I provide the plate 8 with a plurality of transverse slots 16 each of which coöperates with locking bolts 17, the shanks of which pass through the plates 12 and lie within the said slots 16, whereby the manipulation of the locking bolts 17 allows the plates 12 to slide on plate 8 and be locked in the end adjusted position. This feature with its detail of construction forms a material part of my invention as will be appreciated by cotton growers, the brush adjustment above described permitting the brushes 14 to be so adjusted in the desired elevated position with relation to the cotton plants that the machine can be accommodated to young and short plants or to other sized plants in such a manner that the latter may be engaged at the desired point in its height.

The shafts 10 upon which the brushes are mounted or journaled in bearing 18 on the transverse bars 5 and 6 of the frame 1 and are provided at their forward extremity with beveled cog gears 19, said gears being keyed or otherwise secured to their respective shaft for rotation therewith, meshing with the respective cog gears 19 or beveled cog gears 20, the latter being keyed or otherwise secured upon the main driven axle 21 of the machine, said axle 21 being driven through the usual supporting wheels 22. The machine is further supported in a level position with relation to the ground at the rear as well as the front by a trailing wheel 23 secured upon a vertical shaft swiveled at 25 in the central longitudinal bar 3 of the frame 1 of the machine, said bar also serving to support a driver's seat 26 on a spring support 27. The side bars 2 and 4 and central bars 3 are secured at their forward extremities to the front axle 21 by strap bearings 28 to permit of relative and limited rotary or pivotal movement of the frame of the machine and its associated parts, with respect to the axle 21, thus preventing straining or twisting of the parts during operation of the machine on uneven surfaces. The gears 19 and 20 of the respective sets of brushes are so arranged that the set of brushes on one shaft always rotate in opposition to the other set, that is to say, when the machine is driven forward the brushes viewing the machine from the bottom will always appear to rotate toward the center of the machine in a manner to cause the insects on the plants "A" to be brushed into a receptacle, now to be described:

For the purpose of catching or receiving the insects as they are brushed from the plants, I provide a receptacle, rectangular or otherwise, and in the shape of a pan which is supported below the frame of the machine by metal straps 31, these straps being fixed at 32 to the receptacle at 33 to the rear transverse bar 6 and at 34 to the axle 21, the support at the axle being in the nature of strap bearings, permitting the receptacle at this point of its support to have a slight and necessary rotary movement with respect to the said axle in the same manner and for the same purpose as the bearings 28 which forms the supports for the forward portion of the machine frame. The straps 31 may be made adjustable as shown to permit the receptacle to be adjusted to the desired vertical elevation. The receptacle thus described is adapted to contain an insect destroying oil or some suitable insecticide and in the manner in which it is carried by the vehicle, it passes between the rows of plants as clearly shown in Figs. 3 and 4 and receives the insects as they are brushed from the plants.

It is obvious that suitable means of any style may be employed to drive the machine but as I have illustrated on Fig. 1 the usual shaft 35 may be connected to the axle 21 in the most suitable manner and the machine drawn by a single animal.

It is further obvious that many other changes may be employed in the construction of my machine and within the scope of the following claim.

What I claim as my invention and desire to secure by Letters Patent is:

A brush for use with insect destroying machine comprising in combination with a rotary brush shaft, a plurality of independent and detachable main brush supports, provided with parallel slots, a brush carrying head mounted upon each of said main brush supports, locking bolts carried by said brush carrying heads and operation within said slots to lock said brushes in adjusted position and an enlargement at the outer edge of said brush heads having a groove for securing the brushes in position.

L. L. NAIL.

Witnesses:
  R. A. TERRY,
  JOS. A. WALTON.

Copies of this patent may be obtained for five cents each, by addressing the "Commissioner of Patents, Washington, D. C."